(No Model.)
G. CARLYLE.
BUTTON MAKING MACHINE.
No. 561,564. Patented June 9, 1896.
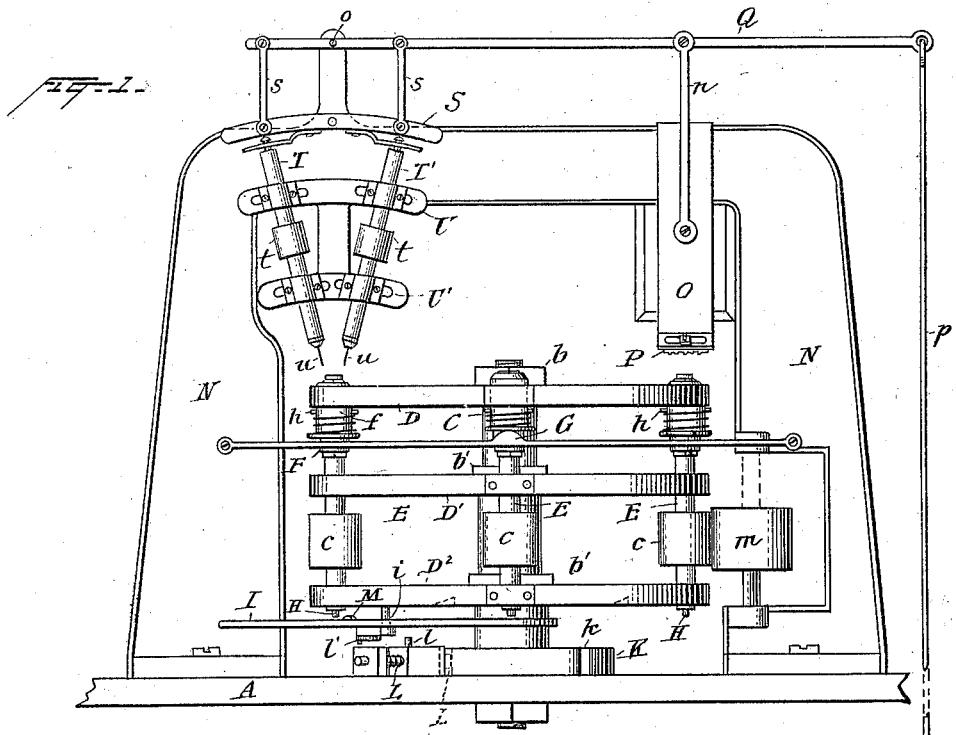
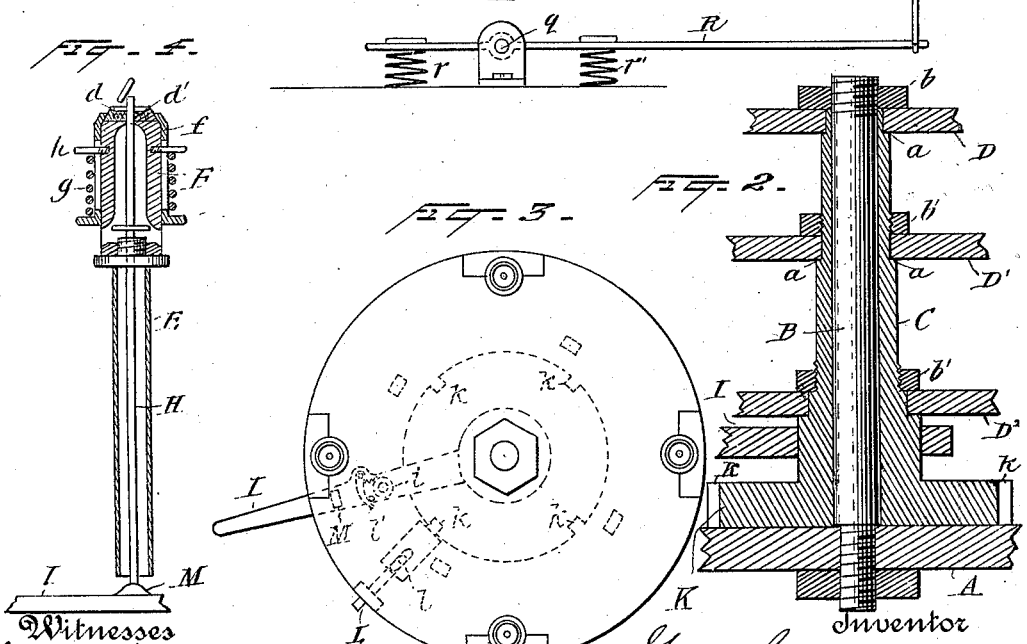
Witnesses
Norris H. Clark.
George B. Crook.
Inventor
George Carlyle
By his Attorneys
Dyer & Seely

UNITED STATES PATENT OFFICE.

GEORGE CARLYLE, OF DETROIT, MICHIGAN, ASSIGNOR TO HENRY W. CROUSE, TRUSTEE, OF NEW YORK, N. Y.

BUTTON-MAKING MACHINE.

SPECIFICATION forming part of Letters Patent No. 561,564, dated June 9, 1896.

Application filed December 23, 1892. Serial No. 456,182. (No model.)

*To all whom it may concern:*

Be it known that I, GEORGE CARLYLE, a citizen of the United States, residing at Detroit, in the county of Wayne and State of Michigan, have invented a certain new and useful Improvement in Button-Making Machines, of which the following is a specification.

The object I have in view is to produce an efficient machine for both forming and drilling buttons, especially those made from mother-of-pearl.

In carrying out my invention I provide a horizontally-rotating table which carries a series of blank-holding chucks, such table being rotated by a pawl-and-ratchet movement and being provided with a dog for locking it in each position of rest, and means being also provided for opening the chucks and discharging the buttons. The forming devices partake of the character of those described in my application for improvement in button-forming machines of even date herewith. Each chuck-spindle is provided with a friction-wheel, which is thrown into engagement with a continuously-rotating wheel when the chuck comes under the cutting-tool. This cutting-tool is mounted in a sliding tool-holder above the table and is a non-rotating plate having a series of cutting edges of the desired configuration. This cutting-tool is moved up and down, out of and into engagement with the button-blank, by a foot-lever. Over the opposite side of the table is mounted a drill-frame consisting of concentrically-placed supports, in which slide two rotating drill-spindles, each carrying a drilling-awl and connected by a belt with the source of power, so as to be rotated continuously. These drill-spindles at their upper ends are connected with a rocking back-piece, pivoted between the points of connection with the spindles, so that the rocking of the back-piece will alternately throw the spindles forward. This rocking movement is produced by connection with the same treadle which reciprocates the forming-tool, so that the act of bringing that tool forward to operate upon a blank causes one of the drills to pierce a blank on the opposite side of the table, while a return movement of the forming-tool withdraws one drill and advances the other.

In the accompanying drawings, forming a part hereof, Figure 1 is front view of the machine. Fig. 2 is a vertical section through the post upon which the chuck-carrying table is mounted. Fig. 3 is a top view of the table; and Fig. 4 is a vertical section of one of the chuck-spindles, showing the discharging-rod.

A is a bed-plate, from the center of which rises the post B. Upon this post is mounted a sleeve C, which turns thereon. Upon this sleeve are placed three plates D D' D², mounted upon shoulders $a$ on the sleeve C and held by nuts $b$ $b'$, the two nuts $b'$ being screwed upon the sleeve, and the nut $b$ being screwed on the upper end of the post B. These plates D D' D² rotate with the sleeve C and form the chuck-carrying wheel. Passing through the three plates and journaled therein are four chuck-spindles E, each of which is provided with a rubber friction-wheel $c$. A chuck-head F is mounted upon the upper end of each spindle, and upon this head are the two chuck-jaws $d$ $d'$, having beveled outer edges. A sleeve $f$ surrounds the chuck-head and has a conical outer end, which grasps the chuck-jaws. This sleeve is drawn inwardly by a spring $g$, resting between a collar on the sleeve $f$ and pins $h$, projecting from the chuck-head through slots in the sleeve.

A stationary cam G is provided midway between the points where the blanks are operated upon by the forming and drilling tools, over which cam the collar on the sleeve $f$ of each chuck rides once in each revolution of the table, thus forcing the sleeve $f$ outwardly and allowing the chuck-jaws to be opened by the springs between them.

A sliding discharging-rod H passes through each spindle and chuck. This rod is forced upwardly when the chuck-jaws are opened and discharges the button, and then drops back again, so that a new blank can be put in the chuck. The device for operating the discharging-rod H will be presently explained. Upon the sleeve C, below the plate D², is swung a hand-lever I, carrying a spring-pawl $i$, which engages with four ratchet-teeth on the under side of the plate D², these ratchet-teeth being placed at equal distances on the under side of such plate and permitting, by the oscillating movement of the lever I, an advance movement of the chuck-carrying table. The lower end of the sleeve C is formed into a disk K, having four notches $k$ in its periphery, and with these notches engages a spring locking-dog L, having a pin $l$, by which it is retracted. A pivoted tongue $l'$ on the under side of the hand-lever I engages with this pin $l$ in the swinging movement of the hand-lever and retracts the locking-dog L. Upon the lever I is also a cam M, which in the swinging movement of the lever strikes the discharging-rod H of the chuck, at that time midway between the operating-tools, thus discharging the button in that chuck, so that a fresh blank can be put in the chuck.

From the base-plate A rises an arched frame N, upon the top piece of which, above the chuck-carrying wheel, are mounted the operating-tools. In this frame at one side is a friction-wheel $m$, connected with the power and turning continuously and engaging with the friction-wheel $c$ of each chuck-spindle as it is brought under the non-rotating forming-tool, so that the chuck-spindle which is under the forming-tool has imparted to it a motion of rotation while it remains in that position. Upon the top piece of the frame N is mounted the vertically-sliding tool-carrier O, carrying on its foot the adjustable forming-tool P. The tool-carrier O is connected by a link $n$ with a lever Q, which is pivoted to the top of the frame N at the point $o$. The lever Q is connected by a link $p$ with the pedal-lever R, pivoted at the point $q$ and maintained in a horizontal position by springs $r\ r'$. It will be seen that by pressing down upon the pedal R on the right-hand side of the pivot the forming-tool P will be advanced to engage with the blank in the chuck directly beneath it, while by releasing the pedal the spring $r'$ will bring it back to a horizontal position and disengage the cutting-tool from the blank.

Directly beneath the pivot $o$ of the lever Q is pivoted a rocking arm S, connected by links $s$ with the lever Q on opposite sides of its pivot. The arm S is connected on opposite sides of its pivot with drill-spindles T T', which slide through bearings in the concentrically-arranged supporting-plates U U'. Each of these drill-spindles has a pulley $t$, connected by a belt with the power, so as to rotate the spindles continuously. The drill-spindles carry at their lower ends drilling-awls $u$. It will be seen that a rocking movement being imparted to the lever Q will cause the arm S to rock upon its pivot and to alternately push forward the drill-spindles, so that their drills will engage with the button-blank directly beneath. In the central position of the lever Q, which is maintained by the springs $r\ r'$, all the tools will be out of engagement with blanks. A depression of the spring $r'$ will bring the forming-tool forward, as before explained, and will also bring forward the drill-spindle T' and retract the drill-spindle T. The depression of the spring $r$ will retract the drill-spindle T' and advance the drill-spindle T.

The operation of the machine will be readily understood from the description already given. The operator, sitting in front of the machine, oscillates the hand-lever I, and in doing so rotates the chuck-carrying wheel, bringing at each movement a fresh blank under the drills and under the forming-tool. Then by moving the pedal R, first with the right foot and then with the left foot, the blank which is under the forming-tool will be formed, and that which is under the drills will be drilled.

What I claim as my invention is—

1. In a button-making machine, the combination with a rotary carrier having an intermittent movement, of two or more independently-rotatable blank-holding chucks carried thereby, a non-rotating forming-tool, one or more rotating drills, said forming and drilling tools acting simultaneously upon different blanks and successively upon the same blank during the intervals of rest of the carrier, and a power connection rotating the chuck whose blank is beneath the forming-tool, substantially as set forth.

2. In a button-making machine, the combination with a rotating chuck-carrier, of a series of independently-rotatable hollow chuck-spindles mounted thereon and adapted to receive button-blanks, forming and drilling tools acting upon the blanks carried by said chucks, an oscillating handle for rotating the chuck-carrier, a cam for opening the chucks, a discharging-rod in each of the chuck-spindles adapted to be operated by the movement of the oscillating handle to discharge the button from the chuck when opened by the cam, and a locking-dog for locking the carrier at each position of rest, said dog being operated by the movement of the oscillating handle, substantially as set forth.

This specification signed and witnessed this 3d day of December, 1892.

GEORGE CARLYLE.

Witnesses:
EUGENE CONRAN,
GEORGE B. CROUK.